(12) United States Patent
Kim et al.

(10) Patent No.: US 9,937,464 B2
(45) Date of Patent: Apr. 10, 2018

(54) DEVICE FOR SEPARATING CARBON DIOXIDE USING SILICONE SEPARATION FILM AND METHOD FOR MANUFACTURING SAME

(71) Applicant: ARSTROMA Co., Ltd., Daegu (KR)

(72) Inventors: Gwan Shig Kim, Pohang-si (KR); Ky Yeong Shin, Daegu (KR)

(73) Assignee: ARSTROMA CO., LTD. (KR)

( * ) Notice: Subject to any disclaimer, the term of this patent is extended or adjusted under 35 U.S.C. 154(b) by 211 days.

(21) Appl. No.: 14/785,445

(22) PCT Filed: Apr. 29, 2014

(86) PCT No.: PCT/KR2014/003757
§ 371 (c)(1),
(2) Date: Oct. 19, 2015

(87) PCT Pub. No.: WO2014/181994
PCT Pub. Date: Nov. 13, 2014

(65) Prior Publication Data
US 2016/0059181 A1    Mar. 3, 2016

(30) Foreign Application Priority Data

May 10, 2013  (KR) .......................... 10-2013-0053058
Oct. 7, 2013  (KR) .......................... 10-2013-0119091

(51) Int. Cl.
*B01D 53/22*   (2006.01)
*B01D 69/12*   (2006.01)
(Continued)

(52) U.S. Cl.
CPC ......... *B01D 53/228* (2013.01); *B01D 53/225* (2013.01); *B01D 69/12* (2013.01);
(Continued)

(58) Field of Classification Search
CPC .............. B01D 2256/245; B01D 69/12; B01D 2258/0283; B01D 2257/504;
(Continued)

(56) References Cited

U.S. PATENT DOCUMENTS 4,737,165 A * 4/1988 Kulprathipanja ...... B01D 59/14
210/490
4,783,202 A * 11/1988 Kraus .................... C08L 85/02
210/500.27
(Continued)

FOREIGN PATENT DOCUMENTS

CN    101293180    10/2008
EP     2995366     3/2016
(Continued)

OTHER PUBLICATIONS

International Application Status Report generated Aug. 13, 2015 issued in International Application No. PCT/KR2014/003757.
(Continued)

*Primary Examiner* — Anthony Shumate
(74) *Attorney, Agent, or Firm* — Onello & Mello, LLP

(57) ABSTRACT

Provided are an apparatus for separating and collecting carbon dioxide and a method of separating carbon dioxide, and more particularly, an apparatus and method of selectively separating carbon dioxide from a byproduct gas using a difference in negative pressure and a difference in carbon dioxide concentration between the inside of a separator, which is made of a ceramic-coated porous silicone membrane and in which the byproduct gas flows, and the outside of the separator in which carbon dioxide is collected.

20 Claims, 8 Drawing Sheets

(51) Int. Cl.
*B01D 71/02* (2006.01)
*B01D 71/70* (2006.01)

(52) U.S. Cl.
CPC ............ *B01D 71/024* (2013.01); *B01D 71/70* (2013.01); *B01D 2053/221* (2013.01); *B01D 2053/223* (2013.01); *B01D 2256/245* (2013.01); *B01D 2257/504* (2013.01); *B01D 2258/0283* (2013.01); *B01D 2259/80* (2013.01); *B01D 2259/816* (2013.01); *Y02C 10/10* (2013.01)

(58) Field of Classification Search
CPC .... B01D 801/223; B01D 71/70; B01D 53/22; B01D 2053/221; B01D 71/024; B01D 2259/80; B01D 2259/816; B01D 53/228; B01D 53/225; B01D 2053/223; Y02C 10/10
See application file for complete search history.

(56) References Cited

U.S. PATENT DOCUMENTS

| | | | |
|---|---|---|---|
| 5,332,547 A * | 7/1994 | Olson | B01D 53/30 422/112 |
| 5,505,824 A * | 4/1996 | McElroy | C25B 1/04 204/257 |
| 6,368,382 B1 * | 4/2002 | Chiou | B01D 53/228 55/524 |
| 7,344,585 B1 | 3/2008 | Kulprathipanja et al. | |
| 7,811,359 B2 | 10/2010 | Tandon et al. | |
| 7,938,894 B2 | 5/2011 | Oyama et al. | |
| 2002/0056371 A1 | 5/2002 | Hayes | |
| 2004/0231358 A1 * | 11/2004 | Wikstrom | B01D 53/00 62/606 |
| 2005/0172811 A1 * | 8/2005 | Oyama | B01D 53/228 96/4 |
| 2008/0047432 A1 * | 2/2008 | Nonaka | B01D 53/228 96/11 |
| 2008/0173179 A1 | 7/2008 | Tandon et al. | |
| 2009/0156875 A1 * | 6/2009 | Tomioka | B01D 3/101 585/802 |
| 2009/0205500 A1 | 8/2009 | Oyama et al. | |
| 2010/0099157 A1 * | 4/2010 | Salvetzki | C12M 21/02 435/167 |
| 2010/0248335 A1 * | 9/2010 | Komatsu | B01D 61/20 435/262.5 |
| 2011/0023497 A1 * | 2/2011 | Assmann | C10L 3/08 60/780 |
| 2011/0189746 A1 * | 8/2011 | Mitariten | C12P 5/02 435/167 |
| 2012/0279922 A1 | 11/2012 | Haensel et al. | |
| 2014/0137736 A1 | 5/2014 | Ahn et al. | |
| 2015/0210936 A1 * | 7/2015 | Burgers | C10G 31/06 208/177 |
| 2015/0321150 A1 * | 11/2015 | Kurahashi | B01D 69/12 427/243 |
| 2016/0009608 A1 * | 1/2016 | Matthias | C07C 7/12 518/722 |
| 2016/0059181 A1 | 3/2016 | Kim et al. | |

FOREIGN PATENT DOCUMENTS

| | | |
|---|---|---|
| GB | 2277885 | 10/1992 |
| JP | 01194926 | 8/1989 |
| JP | 04011692 | 1/1992 |
| JP | 08071384 | 3/1996 |
| JP | 10180062 | 7/1998 |
| JP | 10249175 | 9/1998 |
| JP | 11003723 | 1/1999 |
| JP | 2000279773 | 10/2000 |
| JP | 2002355536 | 12/2002 |
| JP | 3501951 | 3/2004 |
| JP | 2008178874 | 8/2008 |
| KR | 100734926 | 7/2007 |
| KR | 20080068575 | 7/2008 |
| KR | 101059830 | 8/2011 |
| WO | 2012006155 | 1/2012 |
| WO | 2012138755 | 10/2012 |
| WO | 2012170541 | 12/2012 |

OTHER PUBLICATIONS

International Search Report dated Aug. 28, 2014 issued in International Application No. PCT/KR2014/003757.
Venna et al. "Highly Permeable Zeolite Imidazolate Framework-8 Membranes for CO2/CH4 Separation", J. Am. Chem. Soc. vol. 132, No. 1, 2010, pp. 76-78.
Kalambe, S. et al. "Low Pressure Separation Technique of Biogas Into CH4 and CO2 Employing PDMS Membrane". IJAET/vol. III/Issue I, Jan.-Mar. 2012, pp. 311-315.
Chinese Office Action dated Dec. 13, 2016 in corresponding Chinese Application No. 201480026648.4, with English language summary.
European Search Report dated Dec. 12, 2016 in corresponding European Application No. 14794902.8.
Chinese Office Action dated Jun. 20, 2017 issued in corresponding Application No. 201480026648.4, with English language translation.
Canadian Office Action dated Jul. 12, 2017 issued in corresponding Application No. 2,909,395.

* cited by examiner

<FRONT SURFACE OF CONTAINER LID>

<TOP SURFACE OF CONTAINER LID>

DEVICE FOR SEPARATING CARBON DIOXIDE USING SILICONE SEPARATION FILM AND METHOD FOR MANUFACTURING SAME

TECHNICAL FIELD

The present invention relates to an apparatus for separating carbon dioxide from waste gas, and more particularly, to an apparatus for separating carbon dioxide using a separator, which is made of a ceramic-coated porous silicone membrane, and a method of manufacturing the same.

BACKGROUND ART

Global warming is now an issue of worldwide concern, and the greenhouse effect caused by carbon dioxide and methane gas plays a significant role in global warming. Global warming not only disturbs the ecosystem but also has a huge impact on human social life. In this regard, efforts are being made in various aspects to reduce atmospheric emissions of carbon dioxide and methane gas.

In sewage treatment plants, waste water treatment plants, landfill sites, etc., organic substances contained in waste generate gas through decomposition. This gas is called landfill gas. At the initial landfill stage, the landfill gas is decomposed in the presence of oxygen. However, as oxygen is gradually reduced, the landfill gas is primarily decomposed in an anaerobic digestion process. Most of the landfill gas generated in the anaerobic digestion process contains 40 to 60% carbon dioxide, 45 to 60% methane gas, and very small amounts of other components such as nitrogen and ammonia. Methane and carbon dioxide, which are main components of the landfill gas, are the causes of global warming. To make the landfill gas industrially applicable, methane gas and carbon dioxide should be separated from each other.

Global warming caused by an increase in carbon dioxide in the air is one of the important environmental problems that must be solved by mankind. Carbon dioxide is emitted from sewage treatment plants, waste water treatment plants, landfill sites, etc. when waste materials are burned. Carbon dioxide is particularly a problem when emitted from thermoelectric power plants or steel mills. Therefore, technologies of separating and removing carbon dioxide from generated waste gas are being developed. Some carbon dioxide separation technologies already developed include an absorption method, an adsorption method, a cryogenic air separation method, and a membrane separation method.

The absorption method is a method of selectively separating carbon dioxide by absorbing carbon dioxide. In the absorption method, a combustion or process gas that contains carbon dioxide is brought into contact with a solution, such that carbon dioxide can be absorbed by a chemical reaction. Of the absorption method, a wet amine method is commercially available technology. In the wet amine method, carbon dioxide is collected from a combustion exhaust gas using an amine-based absorbent.

The adsorption method is a method of separating carbon dioxide by making carbon dioxide be physically adsorbed onto the surface of an adsorbent having affinity for carbon dioxide.

The cryogenic air separation method is a classic gas-liquid separation method for separating carbon dioxide liquefied at low temperature from other gases not liquefied. This method is advantageous in that it can produce a large amount of liquefied carbon dioxide but disadvantageous in that it requires a lot of energy for cooling.

The membrane separation method generally uses a solid membrane having a separation function. The membrane separation method is widely usable from the molecular level to the particle level depending on the type of membrane used. In addition, since a material is usually separated using pressure which is mechanical energy, less energy is consumed in the membrane separation method than in a distillation method using thermal energy. Applied examples of the membrane separation method include reverse osmosis, ultra-filtration, precision filtration, dialysis, and gas separation. In particular, the gas separation method is drawing attention as a method of separating and collecting carbon dioxide in an energy-saving manner from large-scale sources of carbon dioxide such as thermoelectric power plants, cement plants, and steel mill furnaces.

More specifically, a gas separation membrane that can be used in the membrane separation method to separate and collect a particular gas from, e.g., natural gas, may be an aromatic polyimide membrane which is obtained by polymerizing and imidizing an aromatic tetracarboxylic acid component and an aromatic diamine component. Research has been actively conducted on the aromatic polyimide membrane. However, the aromatic polyimide gas separation membrane can be manufactured only at a high temperature of 350 t or above and has problems in heat resistance, durability, and chemical resistance. Therefore, solutions to these problems need to be researched.

Other conventional technologies of separating and collecting carbon dioxide are disclosed in Korean Patent Publication No. 10-0734926 and Japanese Patent Laid-Open Publication No. hei 10-180062. Korean Patent Publication No. 10-0734926 discloses an apparatus for removing a sulfur compound and separating methane and carbon dioxide using a liquid iron chelate catalyst. The apparatus can process a sulfur compound in a bad-smelling gas generated by a landfill site or an anaerobic digester and separate and collect methane and carbon dioxide in the gas. In addition, Japanese Patent Laid-Open Publication No. hei 10-180062 discloses a separation membrane and a selective separation method. Here, the separation membrane can separate carbon dioxide from a mixture of carbon dioxide and methane using a dense membrane or an asymmetric membrane that contains, as its main component, fluorine-containing polyimide resin having high separability and permeability for carbon dioxide.

Until now, various methods of separating and collecting carbon dioxide including the above conventional technologies have been suggested. However, it is difficult to form a separation membrane having a large size of 10 cm$^2$ or more. In addition, when partial pressure on both sides is used, a massive amount of energy is consumed, and a separation membrane that can withstand this pressure difference cannot be formed.

DISCLOSURE

Technical Problem

Aspects of the present invention provide an apparatus for selectively separating and collecting carbon dioxide from a byproduct gas (methane gas, carbon dioxide and other gases will collectively be referred to as 'byproduct gas') using a separator or plate made of a porous silicone membrane.

Aspects of the present invention also provide a method of efficiently separating carbon dioxide by simplifying a separation membrane manufacturing process and a separation process thereby to increase the size of a separation apparatus and reduce energy needed to separate carbon dioxide.

Technical Solution

According to an aspect of the present invention, there is provided an apparatus for separating carbon dioxide. The apparatus includes: a byproduct gas storage tank which stores a byproduct gas generated by a basic environmental treatment facility and containing a large amount of methane and carbon dioxide; a byproduct gas inlet through which the byproduct gas is fed from the byproduct gas storage tank and a byproduct gas outlet through which a methane-containing byproduct gas obtained by separating carbon dioxide from the fed byproduct gas is discharged; a separation container which includes a separator made of a porous silicone membrane that separates carbon dioxide from the fed byproduct gas; a discharge pipe which is formed in the separation container to discharge carbon dioxide separated from the porous silicone membrane; a carbon dioxide storage tank which receives and stores the separated carbon dioxide; and a remaining byproduct gas storage tank which stores the methane-containing byproduct gas obtained by separating carbon dioxide from the fed byproduct gas.

According to another aspect of the present invention, there is provided a carbon dioxide separation membrane including: a separation membrane which is made of porous silicone; and a coated layer which is obtained by coating nanoceramic powder on the porous silicone separation membrane.

According to another aspect of the present invention, there is provided a method of separating carbon dioxide from a byproduct gas using an apparatus for separating carbon dioxide which includes a carbon dioxide separation membrane.

Advantageous Effects

According to the present invention, a separator or plate made of a ceramic-coated porous silicone membrane is used. Therefore, carbon dioxide can be selectively separated from a byproduct gas using a very small pressure difference and a simple method.

A conventional apparatus for separating carbon dioxide uses a pressure difference. That is, the conventional apparatus for separating carbon dioxide separates carbon dioxide by feeding a mixed gas into a pressure of 3 to 40 kgf/cm² or a higher pressure. Therefore, high energy consumption is required. In addition, since there is a limit to increasing the size of the apparatus, there is a limit to production. However, the present invention operates an apparatus for separating carbon dioxide at room temperature by maintaining a difference in pressure between the inside and outside of a separation membrane at less than 4 kgf/cm². Therefore, energy consumption is low. Further, since the apparatus is simple, the product cost of the apparatus can be saved.

Also, ease of installation is ensured because the apparatus can be installed even in dirty water that generates a byproduct gas or under water.

BEST MODE

The present invention discloses an apparatus for separating carbon dioxide. The apparatus includes: a byproduct gas storage tank which stores a byproduct gas generated by a basic environmental treatment facility and containing a large amount of methane and carbon dioxide; a byproduct gas inlet through which the byproduct gas is fed from the byproduct gas storage tank and a byproduct gas outlet through which a methane-containing byproduct gas obtained by separating carbon dioxide from the fed byproduct gas is discharged; a separation container which includes a separator made of a porous silicone membrane that separates carbon dioxide from the fed byproduct gas; a discharge pipe which is formed in the separation container to discharge carbon dioxide separated from the porous silicone membrane; a carbon dioxide storage tank which receives and stores the separated carbon dioxide; and a storage tank which stores the methane-containing byproduct gas obtained by separating carbon dioxide from the fed byproduct gas.

MODE FOR INVENTION

Hereinafter, exemplary embodiments of the present invention will be described in further detail with reference to the attached drawings.

A gas separation membrane method is used to separate a specific component from a mixed gas or organic vapor by using permeation of a gas through a membrane. When a gas mixture contacts the surface of a membrane, gas components diffuse through the membrane by being dissolved or adsorbed into the membrane. Here, the solubility and permeability of each gas component may vary according to the material of the separation membrane. For example, while carbon dioxide, water vapor, helium, and hydrogen sulfide can easily permeate through a membrane by being easily adsorbed or dissolved into the membrane, nitrogen, methane, ethane and other hydrocarbons are gas components that permeate through the membrane at very low speed. This is a basic reason why a membrane is used to separate oxygen from nitrogen and carbon dioxide from methane in the air.

Figure 1:
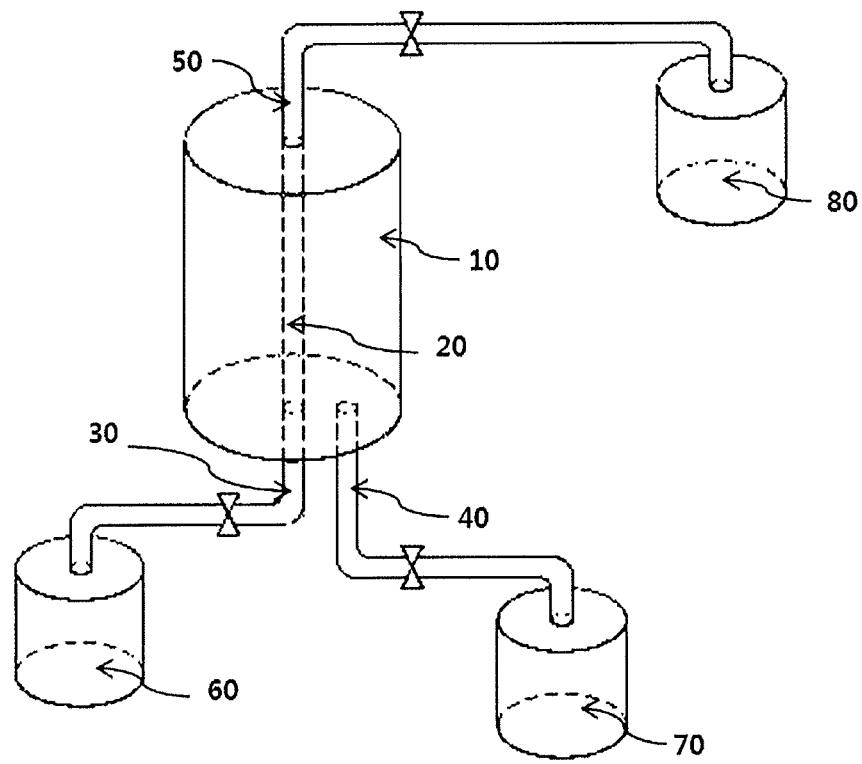
FIG. 1 is a schematic view of an apparatus for separating carbon dioxide from a byproduct gas.

FIG. 1 is a schematic view of an apparatus for separating carbon dioxide from a byproduct gas according to an embodiment of the present invention. An apparatus for separating and collecting carbon dioxide includes a byproduct gas storage tank 60 which stores a byproduct gas that contains a large amount of methane and carbon dioxide, a byproduct gas inlet 30 through which the byproduct gas is fed from the byproduct gas storage tank 60, a byproduct gas outlet 50 through which a methane-containing byproduct gas obtained by separating carbon dioxide from the fed byproduct gas is discharged, a separation container 10 which includes a separator 20 for separating carbon dioxide from the fed byproduct gas, a discharge pipe 40 through which the separated carbon dioxide is discharged from the separation container, a carbon dioxide storage tank 70 which receives and stores the separated carbon dioxide, and a tank 80 which receives and stores the methane-containing byproduct gas obtained by separating carbon dioxide from the fed byproduct gas.

Generally, when the gas separation membrane method is used to separate a specific gas, it is required to increase pressure at the feed side and reduce pressure at the permeate side, so that the gas can permeate through a separation membrane effectively. The present invention, however, uses a difference in negative pressure applied to the inside and outside of a separation membrane, which is installed in the separation container, for a specific gas component. In this case, the separation container may be maintained at a temperature of 0 to 60° C., more preferably, in a low temperature range of 20 to 40° C. In addition, the separation container may be a carbon dioxide separation apparatus which undergoes no phase change by maintaining a pressure of 0 to 4 kgf/cm² and has low energy consumption. Here, carbon dioxide can be separated more efficiently by an osmotic pressure phenomenon resulting from a difference between the concentration of carbon dioxide contained in a byproduct gas and the concentration of carbon dioxide separated from the byproduct gas. Even when the concentration of carbon dioxide is the same inside and outside the separate pipe, the separation of carbon dioxide may be continued by the difference in negative pressure.

More specifically, the separation container 10 of the present invention can obtain energy required to separate carbon dioxide from the difference in carbon dioxide concentration between the inside D1 of the separation membrane made of a porous silicone membrane and the outside D2 of the separator. Here, a byproduct gas flows inside D1 the separator, and only carbon dioxide separated from the byproduct gas exists outside D2 the separator. When initial pressure P1 by which a byproduct gas is fed into the separator 20 is greater than or equal to pressure P2 inside the separator, carbon dioxide permeates through the porous silicone membrane in any situation if carbon dioxide concentration of D1 is greater than that of D2. In addition, the separated carbon dioxide is periodically transported to the carbon dioxide storage tank in order to prevent carbon dioxide concentration of D2 from becoming greater than that of D1. In this way, carbon dioxide can be selectively separated by continuously permeating through the porous silicone membrane. As a result, high-purity carbon dioxide can be obtained.

The permeability of carbon dioxide separated from the byproduct gas may be calculated by Equation (1) below:

$$\text{Permeability} = \frac{\text{the amount of carbon dioxide permeating per unit time (mol/sec} \cdot \text{m}^2)}{\text{partial pressure (Pa) at the feed side} - \text{partial pressure (Pa) at the permeate side}}. \quad (1)$$

In the present invention, a pump may be installed at the outlet to facilitate the discharge of the methane-containing byproduct gas without carbon dioxide through the outlet. Here, the pump may be maintained at a pressure of 0 to 2 kgf/cm² in order to maintain a pressure difference within the separation container in a range of 0 to 4 kgf/cm².

In addition, another pump may be installed at a carbon dioxide collection line in order for efficient collection of separated carbon dioxide. Here, the pump may be maintained at a pressure of approximately 0 to −1 kgf/cm².

The separation membrane may be made of a polymer material such as cellulose acetate or polysulfone, a new polymer material, a ceramic material or a carbon molecular sieve material. Preferably, the separation membrane may be made of porous silica-based ceramics, porous silica-based glass, porous alumina-based ceramics, porous stainless steel, porous titanium, or porous silver. More preferably, the separation membrane may be made of porous silicone.

In the present invention, the separator 20 made of the porous silicone membrane may be in the form of a vertical sheet, a horizontal sheet, or a tube. More preferably, the separator 20 may be in the form of a tube.

Figure 2:
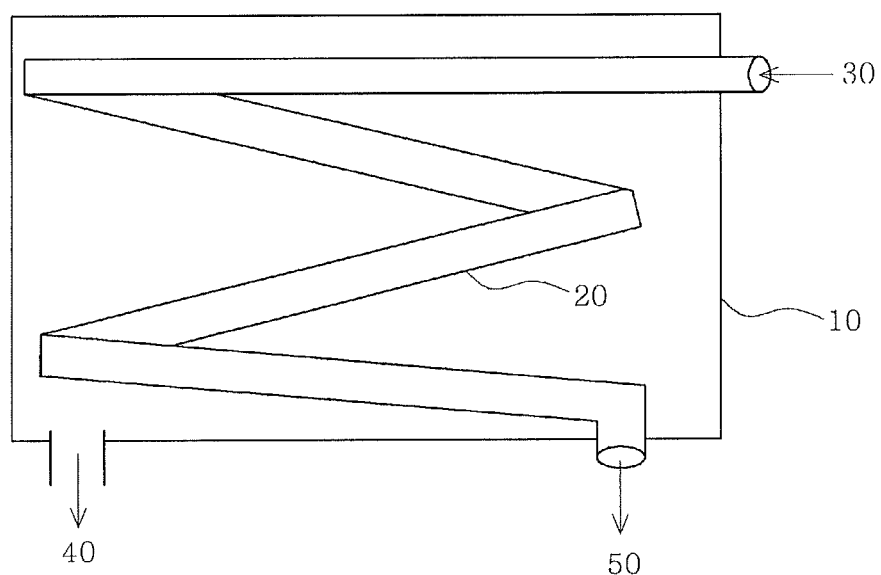
FIG. 2 illustrates an apparatus for separating and collecting carbon dioxide from a byproduct gas fed into a separator.
Figure 3:
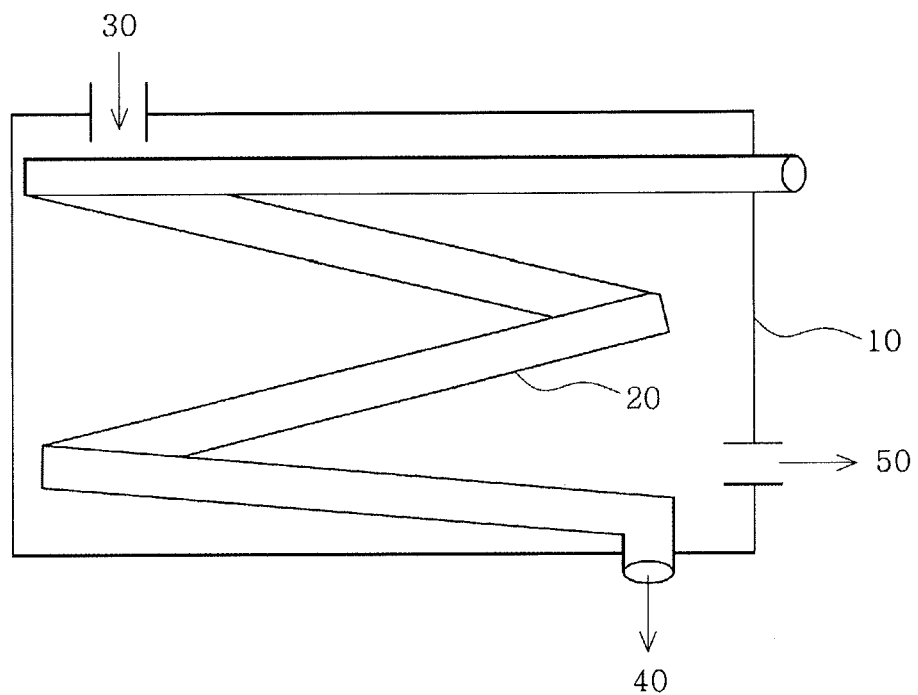
FIG. 3 illustrates an apparatus for separating carbon dioxide, through a separator, from a byproduct gas fed into a separation container.

FIGS. 2 and 3 illustrate different embodiments in which a byproduct gas is fed into either the separator 20 or the separation container 10 using reversible characteristics of a separator. Specifically, FIG. 2 illustrates a case where when a byproduct gas fed into the separator 20 as indicated by reference numeral 30 flows through the separator 20, carbon dioxide is adsorbed and passed through the separation membrane to be collected in the separation container 10 as indicated by reference numeral 40. FIG. 3 illustrates a case where when a byproduct gas fed into the separation container 10 as indicated by reference numeral 30 is absorbed and permeates into the separator to be discharged as indicated by reference numeral 40.

Figure 4:
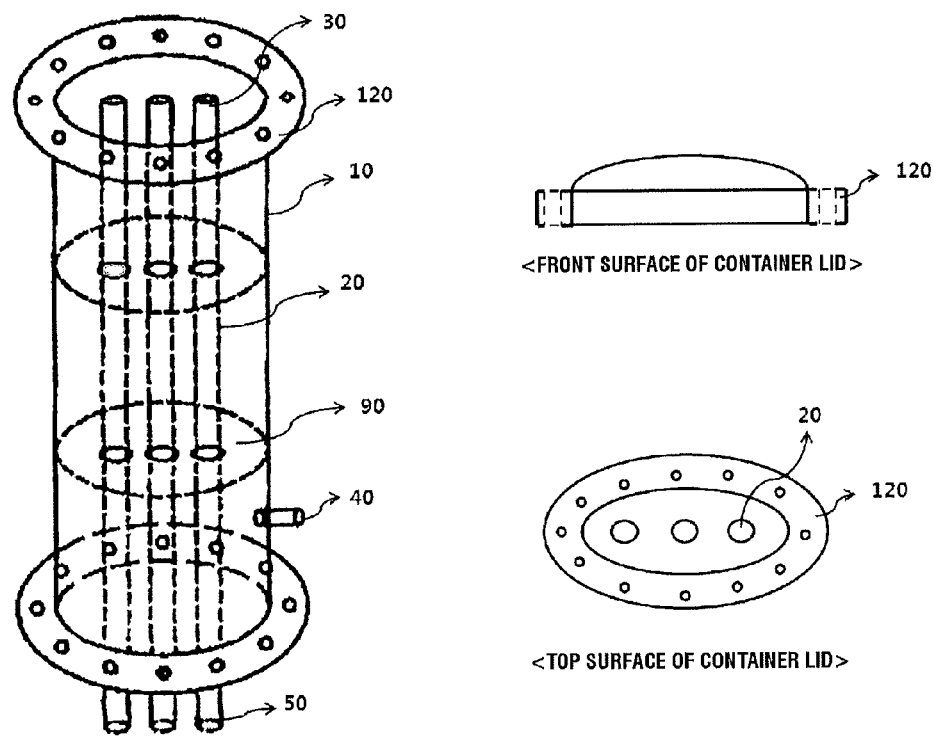
FIG. 4 illustrates a separation container having a plurality of separators in the form of tubes and a separation container lid.

FIG. 4 illustrates a separation container having a plurality of separators in the form of tubes and a separation container lid. To increase the productivity of collecting carbon dioxide, a plurality of separators 20 may be installed in a separation container 10 as illustrated in FIG. 4. The separators can be installed at a desired angle, e.g., vertically or horizontally, and a large-scale apparatus for separating carbon dioxide can be manufactured by connecting two or more separation containers 10. Here, a support 90 may be installed at appropriate locations to support and protect the separators.

Figure 5:
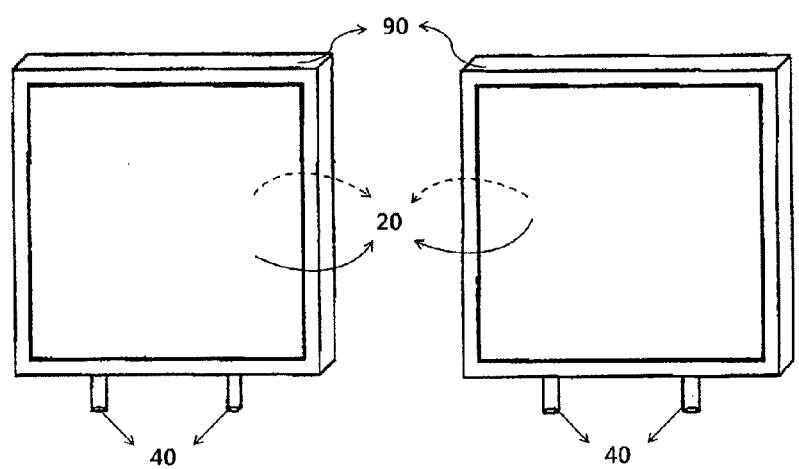
FIG. 5 illustrates a box-type separator having separation membranes, which are in the form of sheets, placed to face each other.

In addition, the porous silicone membrane of the present invention can be manufactured in the form of a sheet to produce a box-type separator with an increased separation area. Accordingly, the amount of carbon dioxide separated and collected can be increased. For example, FIG. 5 illustrates a separator 20 having a surface area increased by installing separation membranes, which are manufactured in the form of sheets, to face each other with an empty space therebetween. The separator includes a support 90 shaped like a quadrilateral frame. The support 90 maintains a predetermined gap between the separation membranes.

Figure 6:
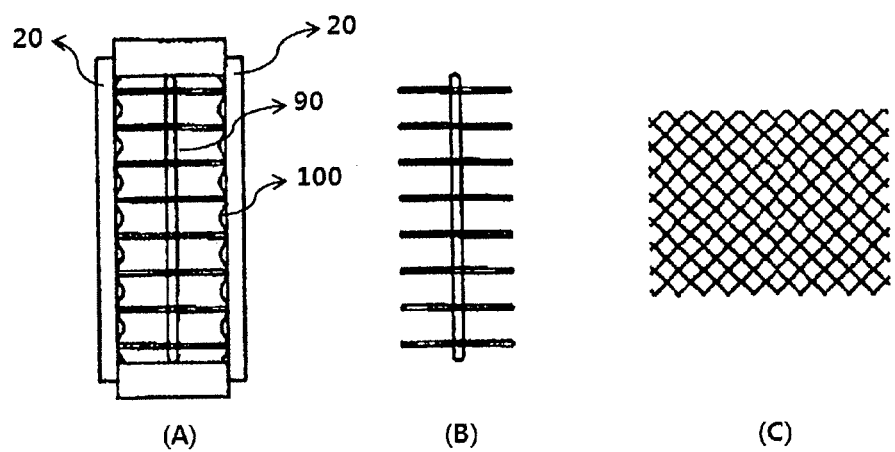
FIG. 6 illustrates a mesh and a support installed between separation membranes of a box-type separator which extends along a lengthwise direction thereof.

FIG. 6(A) illustrates a box-type separator which extends along a lengthwise direction thereof and in which a support 90 and a mesh 100 are installed between separation membranes 20 to maintain a predetermined gap between the separation membranes 20, protect the separation membranes 20 and allow carbon dioxide to be separated. FIG. 6(B) illustrates the support 90 only. The support 90 supports the mesh 100 to suppress excessive expansion of the separation membranes 20. FIG. 6(C) illustrates the mesh 100 only. The mesh 100 is a structure that suppresses excessive expansion of the separation membranes 20 due to a difference in pressure between the inside and outside of the separator in the process of separating carbon dioxide and maintains a predetermined gap between the separation membranes.

To increase the carbon dioxide separation area, a plurality of box-type separators 20 are installed in a separation container 10. In this case, a byproduct gas is injected from outside the separators 20, and carbon dioxide is discharged and collected from each of the separators 20 through a discharge pipe 40. In addition, a through hole may be formed in each of the separators 20 to directly connect the separators 20 by compression. In this case, carbon dioxide may be collected along the through holes, or a carbon dioxide connection pipe may be installed between the separators. Since a separator is reversible, a byproduct gas may be injected into a separator, and separated carbon dioxide may be collected outside the separator.

Figure 7:
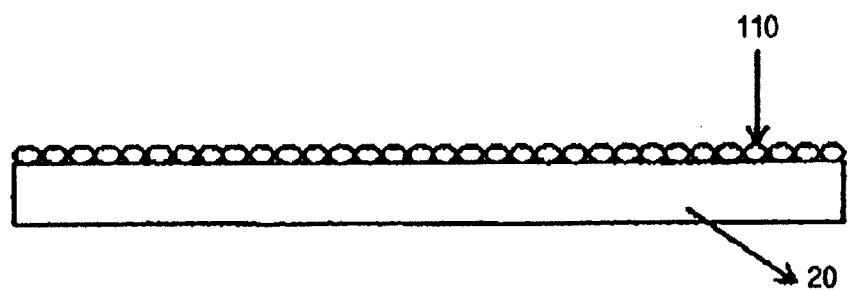
FIG. 7 illustrates nanoceramic coated on the surface of a separation membrane.

FIG. 7 illustrates nanoceramic coated on the surface of a separation membrane. In the present invention, ceramic nano-powder may be coated on the inside and outside of the porous silicone separation membrane. Ceramic may be any one or more of Fe-based oxide, Pd-based oxide, Ti-base oxide, and Al-based oxide which have affinity for carbon dioxide. Preferably, ceramic may be any one or mixture of $Fe_2O_3$, $TiO_2$, PdO, $Al_2O_3$, MgO, NiO, $Y_2O_3$, $SiO_2$, $ZrO_2$, and Zeolite.

Generally, ceramic is superior to an organic polymer membrane in terms of heat resistance, chemical stability, and mechanical/physical properties. Therefore, it can be applied in a high temperature, high pressure, and corrosive atmosphere. In addition, when porous ceramic is applied to a separation membrane, gas molecules may be passed through micropores by Knudsen diffusion, surface diffusion, or activated diffusion in a molecular sieve region depending on the size or surface characteristics of the micropores. Also, to improve separation performance, surface diffusion may be induced by controlling the size and structure of the micropores and reforming the surface of the micropores. Consequently, a ceramic-coated layer of the present invention can be advantageously used as a separation membrane for adsorption and diffusion of carbon dioxide due to its superior affinity for carbon dioxide.

According to a ceramic coating method, a separation membrane may be immersed in a suspension obtained by diluting ceramic powder with water and then taken out from the suspension and dried. A thickness of the ceramic-coated membrane may be adjusted by the size of the ceramic powder and the number of times that the separation membrane is immersed in the suspension. Alternatively, a ceramic coating method by spraying the suspension or a ceramic deposition method can be used.

In addition, the surface of a separation membrane can be reformed to be alkaline by coating the separation membrane with an alkali metal or an alkaline earth metal such as sodium, potassium, magnesium or barium. In this case, carbon dioxide, which is an acid gas, can be separated efficiently.

In addition, the support 90 or the mesh 100 may be made of a metal to apply an electric field. The electric field applied to the support or the mesh can facilitate the movement of carbon dioxide molecules. When the mesh is made of an organic material, an electrode made of a metal conducting wire may be added to supply a voltage. When the mesh or the support is a metal, there is no need to add the electrode.

More specifically, an electric field applied to the mesh, the support or the electrode may supply any one or both of a direct current and an alternating current, more specifically, a direct current of 0.01 to 50 kV or an alternating current of 0.01 to 50 kV in a state of 1 Hz to 1 MHz. This facilitates the movement of carbon dioxide molecules, thereby increasing the speed at which the carbon dioxide molecules pass through a carbon dioxide separation membrane. Accordingly, carbon dioxide can be separated more easily. Here, care is needed to prevent the separator from being damaged by an overcurrent.

In the present invention, a sound wave generator may also be installed on a movement path of a byproduct gas within the separator made of the porous silicone membrane. The sound wave generator may vibrate the porous silicone membrane, thereby making the separation of carbon dioxide more efficient. The sound wave generator may vibrate the porous silicone membrane by generating a sound wave of 1 Hz to 100 kHz. Accordingly, carbon dioxide can easily pass through the porous silicone membrane to be separated more easily. Here, when the sound wave of the sound wave generator is too high, care is needed to prevent the separator from being damaged by a resonance phenomenon.

Figure 8A:
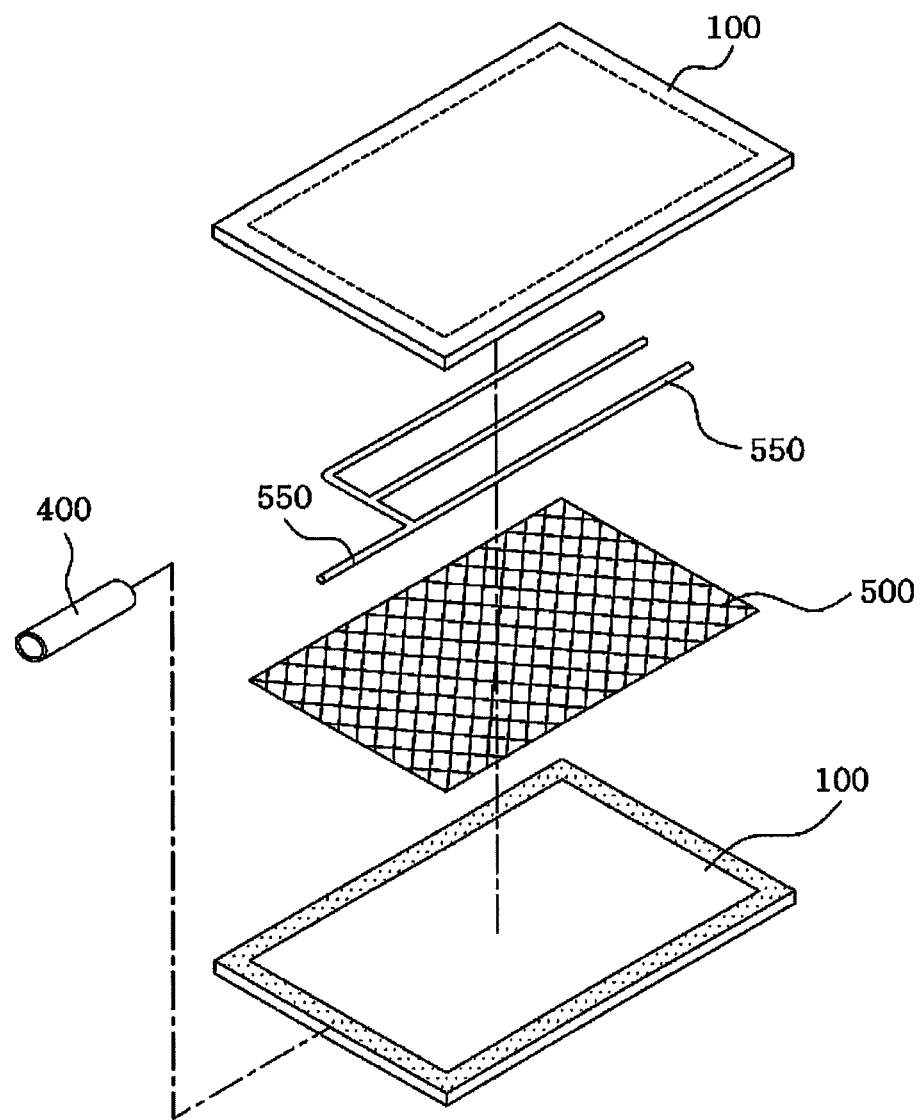
FIG. 8A is an exploded perspective view of carbon dioxide separation membranes manufactured in the form of sheets.
Figure 8B:
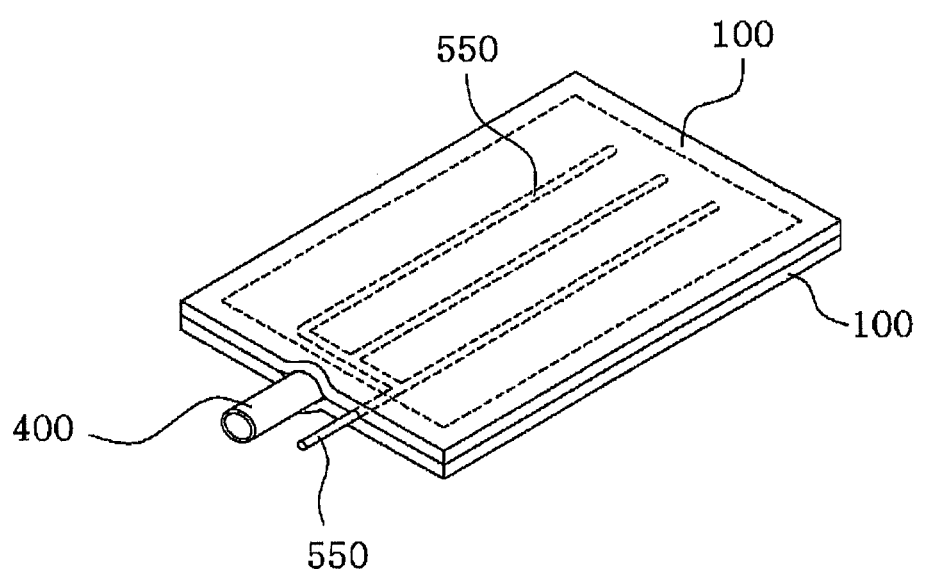
FIG. 8B illustrates an assembled apparatus for separating carbon dioxide, having the carbon dioxide separation membranes manufactured in the form of sheets.

FIG. 8A is an exploded perspective view of carbon dioxide separation membranes manufactured in the form of sheets. FIG. 8B illustrates an assembled apparatus for separating carbon dioxide. To assemble the apparatus for separating carbon dioxide, an inlet or outlet 400, a mesh 500 and an electrode 550 are placed between upper and lower separation membranes 100 in the form of sheets, and then the upper and lower separation membranes 100 are bonded together by applying an adhesive onto edges of the upper and lower separation membranes 100.

The mesh 500 is a mesh-shaped elastic material that serves as a support in a tube hose. The mesh 500 is made of nylon, resin, or a metal material such as a spring. When the pressure between the upper and lower sheets becomes negative, the mesh 500 prevents the upper and lower sheets from being attached to each other and thus losing their separation function. The mesh may be manufactured in the form of a tube or a sheet.

A separation container of the apparatus for separating carbon dioxide may use a stacked plate, which is in the form of a sheet, or a tube. A byproduct gas is passed through the separation container having a stack of a plurality of separation membranes in the form of sheets, and only carbon dioxide is separated and extracted through the inlet or outlet 400. The opposite is possible. That is, a byproduct gas can be passed through the inlet or outlet 400, and only carbon dioxide can be separated and extracted within the separation container. Therefore, the inlet or outlet 400 can be formed on only one side or on both sides of the separation membranes in the form of sheets.

Figure 9A:
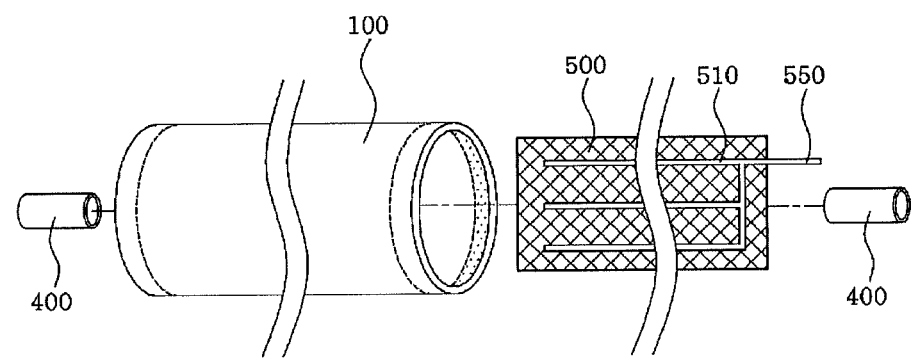
FIG. 9A is an exploded perspective view of a carbon dioxide separation membrane manufactured in the form of a tube.
Figure 9B:
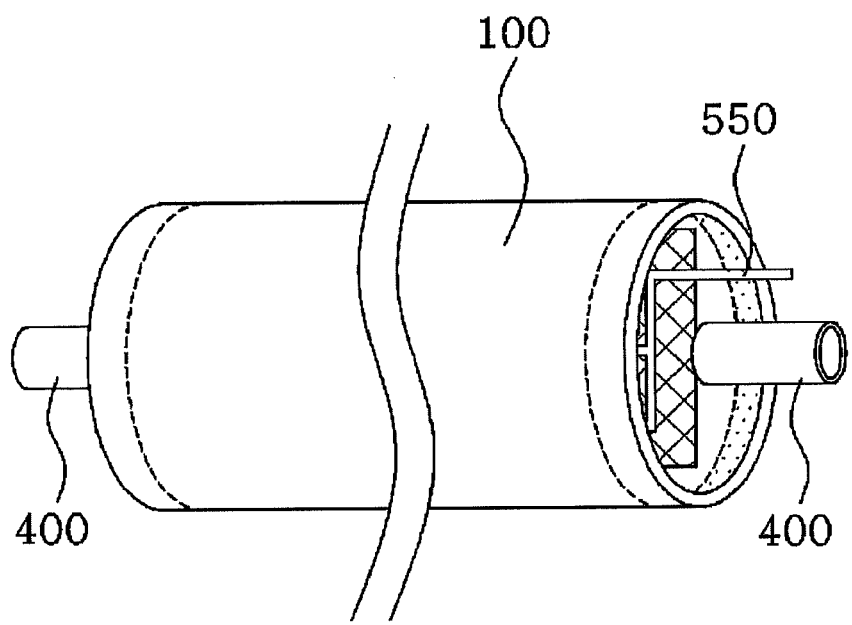
FIG. 9B illustrates an assembled apparatus for separating carbon dioxide, having the carbon dioxide separation membrane manufactured in the form of a tube.

FIG. 9A is an exploded perspective view of a carbon dioxide separation membrane manufactured in the form of a tube. FIG. 9B illustrates an assembled apparatus for separating carbon dioxide. The apparatus for separating carbon dioxide is assembled by inserting an inlet or outlet 400, a mesh 500 and an electrode 550 into a carbon dioxide separation membrane tube and sealing the carbon separation membrane tube with an adhesive applied onto both ends of the carbon separation membrane tube.

Figure 10:
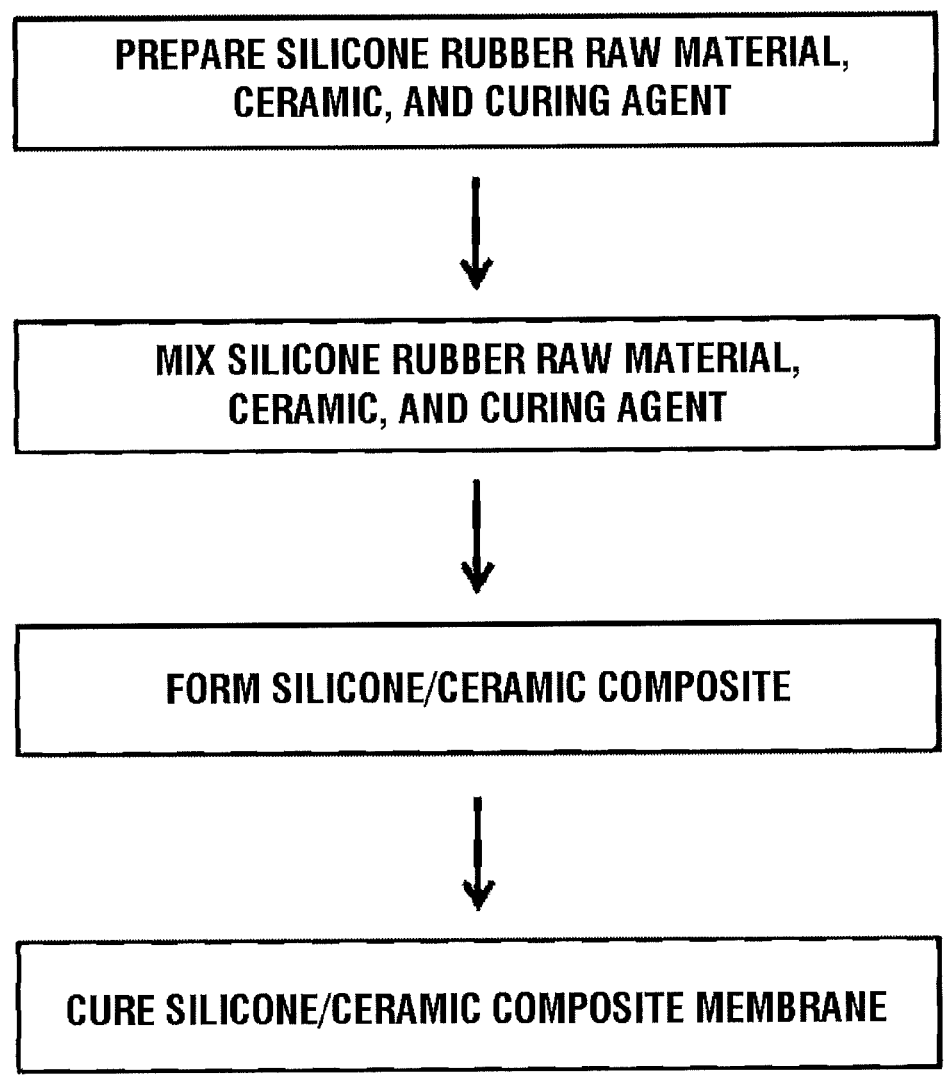
FIG. 10 is a flowchart illustrating a method of forming a carbon dioxide separation membrane.

FIG. 10 illustrates a method of forming a carbon dioxide separation membrane according to another embodiment of the present invention. The porous silicone membrane can be formed by mixing a silicone rubber raw material, ceramic powder and a curing agent, extruding the mixture, and curing the extruded mixture at a temperature of 80 to 300° C.

Specifically, the method of forming a carbon dioxide separation membrane may include a) preparing a mixture by mixing a silicone rubber raw material, ceramic and a curing agent, b) stirring the mixture, c) extruding the stirred mixture as a ceramic-containing silicone composite membrane by injecting the stirred mixture into an extruder at a temperature of 50 to 100° C., and d) curing the composite membrane at a temperature of 100 to 300° C.

Generally, the silicone rubber maintains its properties even at high temperature. Therefore, the silicon rubber exhibits far better tensile strength, elongation rate, and wear resistance than general organic rubber. Unlike other organic rubbers, the silicone rubber has a molecular structure without a double bond that creates cracks by reacting with oxygen, ozone, and ultraviolet rays in the atmosphere. Therefore, the silicone rubber has excellent weather resistance, which makes it hardly suffer from a change in physical properties even if used for a long period of time. In addition, the silicone rubber has heat resistance, low-temperature flexibility, excellent strength, and fire-retardant properties. Most of all, since the permeability of the silicone rubber to oxygen and organic vapor is high, the silicone rubber is used to concentrate oxygen in the air and collect organic vapor.

The ceramic powder may be any one or more of Fe-based oxide, Pd-based oxide, Ti-base oxide, and Al-based oxide which have affinity for carbon dioxide. Preferably, the ceramic powder may be any one or mixture of $Fe_2O_3$, $TiO_2$, PdO, $Al_2O_3$, MgO, NiO, $Y_2O_3$, $SiO_2$, $ZrO_2$, and Zeolite. The ceramic powder may be used in an amount of 0.001 to 10% by weight based on the weight of the silicone rubber raw material. Due to its superior affinity for carbon dioxide, the ceramic powder may facilitate the adsorption and diffusion of carbon dioxide to the separation membrane.

In addition, the curing agent may be organic peroxide that can generate radicals through pyrolysis at a temperature of 20 to 200° C. For example, the curing agent may be, but is not limited to, benzoyl peroxide, 2,4-dichlorobenzoyl peroxide, p-methylbenzoyl peroxide, o-methylbenzoyl peroxide, 2,4-dicumyl peroxide, 2,5-dimethyl-bis(2,5-t-butylperoxy) hexane, di-t-butyl peroxide, t-butyl perbenzoate, or 1,6-hexanediol-bis-t-butyl peroxy carbonate.

Here, after the ceramic and the curing agent are mixed, they may be mixed with the silicone rubber raw material. The curing agent may be added in an amount of 0.1 to 15 parts by weight, in particular, 0.2 to 10 parts by weight based on 100 parts by weight of the total weight. When the curing agent is added at less than 0.1 parts by weight, the rubber raw material may become too soft or a cheese state after being cured, thus making it inappropriate for use in the silicone separation membrane of the present invention. When the curing agent is added at more than 15 parts by weight, mechanical/physical properties may be degraded, and it may take more time to remove the remaining curing agent after the curing process.

In operation b) of the present invention, the mixture of the ceramic and the curing agent may be mixed with the silicone rubber raw material and then stirred for 10 minutes to 5 hours at room temperature to mix them evenly. Here, if the mixture of the ceramic, the curing agent and the silicone rubber raw material is not stirred enough, it may cause a difference in the density of the ceramic in the silicone rubber raw material, make a thickness of the molded separation membrane non-uniform, and cause an exfoliation phenomenon. For this reason, the mixture of the ceramic, the curing agent and the silicone rubber raw material should be stirred enough.

In addition, in operation c) of the present invention, the stirred mixture of operation b) is extruded. The stirred mixture is injected into an extruder heated to a temperature of 50 to 100° C. and extruded as a ceramic-containing silicone composite membrane in the form of a tube. Then, the ceramic-containing silicone composite membrane is cured up to an uncured portion in the heat of 100 to 300° C. at atmospheric pressure to produce a silicone ceramic composite membrane in the form of a tube.

Here, an increase in the content of the curing agent or an increase in curing temperature in the process of mixing the above raw materials can reduce the curing time. In addition, the use of a far-infrared panel heater can further reduce the time required to cure the silicone rubber.

In the present invention, the silicone composite membrane obtained by extruding the stirred mixture may be molded into a vertical sheet, a horizontal sheet or a tube.

In the present invention, the composite membrane obtained by extruding the stirred mixture may also be a porous silicone composite membrane that contains ceramic. The ceramic may has a grain size of 1 nm to 100 μm.

In the present invention, a separation membrane made of porous silicone may be in the form of a tube having a diameter of 1 to 100 mm, more preferably, 2 to 50 mm. In addition, the separation membrane made of porous silicone may have a thickness of 0.05 to 3 mm, more preferably, 0.1 to 2 mm. When the diameter and thickness of the separation membrane is outside a predetermined range, the surface area and the permeability of carbon dioxide can be affected.

In addition, pores formed in the silicone membrane may have a diameter of 0.3 to 0.37 nm, more preferably, 0.32 to 0.35 nm. When silicone pores have a diameter of more than 0.38 nm based on a kinetic molecular diameter that is usually used to compare gas diffusivities, methane as well as carbon dioxide can be separated. When the silicon pores have a diameter of less than 0.33 nm, carbon dioxide may not be separated. Therefore, a porous silicone membrane having an appropriate pore diameter should be used.

The nanoceramic powder used in the present invention may have an average grain size of 1 to 100 nm, more preferably, 2 to 50 nm.

In addition, the ceramic-coated membrane in the present invention may have a thickness of 2 nm to 1000 μm. When the ceramic-coated membrane is too thick or too thin, cracks or exfoliation can occur. Since carbon dioxide cannot permeate through a too thick ceramic-coated layer, the thickness of the ceramic-coated layer should be adjusted.

The separation membrane may be coated with ceramic by dip coating, flow coating, roll coating or spray coating, preferably, by dip coating. Here, the ceramic may be dispersed in water or any one of alcohol-based organic solvents such as methanol, ethanol and propanol and then used to coat the separation membrane. The ceramic may most preferably be dispersed in water. The ceramic may be dispersed for 30 minutes to 1 hour using an ultrasonic disperser and then be used to coat the separation membrane.

In addition, the present invention may provide a method of separating carbon dioxide from a byproduct gas using an apparatus for separating carbon dioxide which includes a separator made of a porous silicone membrane.

Here, a difference in pressure between the inside and outside of the separator made of the porous silicone membrane is less than 4 kgf/cm². When the difference in pressure between the inside and outside of the separator is 4 kgf/cm² or greater, a flow rate of the byproduct gas increases, thus making it difficult for carbon dioxide to be absorbed and passed through the porous silicone membrane. In addition, the expansion of the porous silicone membrane may become noticeable. Therefore, it is desirable to separate carbon dioxide in the range of sound pressure near atmospheric pressure.

Hereinafter, the present invention will be described in greater detail by way of examples. These examples are provided to illustrate the present invention, and it will be obvious to those of ordinary skill in the art that the scope of the present invention is not construed as being limited by these examples.

EXAMPLE

In the present invention, carbon dioxide collected was qualitatively and quantitatively analyzed using gas chromatography analysis, and a flow rate was measured using a mass flow meter (MFC).

Example 1: Experiment Conducted Using a Porous Silicone Tube as a Separator

A porous silicone tube having a thickness of 2 mm was installed as the porous silicone membrane 20 of FIG. 1, and a mixed gas containing 50% carbon dioxide and 50% nitrogen was used as a byproduct gas. The byproduct gas was injected into a reactor at a constant flow rate of 2.5 cc/sec using the MFC.

As the byproduct gas flowed at the constant flow rate, carbon dioxide permeated through the separator made of the silicon tube. As a result, a collection rate of carbon dioxide separated from the byproduct gas was 94%.

Example 2: Experiment Conducted Using a Nanoceramic-Coated Porous Silicone Tube as a Separation Membrane After 0.5 g of nanoceramic was mixed with 100 g of water, the mixture was dispersed sufficiently using an ultrasonic disperser. Then, a silicone tube having a thickness of 2 mm was immersed in the dispersed mixture for 30 minutes. After 30 minutes, the silicon tube was taken out from the dispersed mixture and dried for 3 to 4 hours at room temperature. This process was repeated three or more times so that the mixture can be evenly coated on the inside and outside of the tube.

The coated porous silicone tube was installed as the porous silicone membrane 20 of FIG. 1, and a mixed gas containing 50% carbon dioxide and 50% nitrogen was used as a byproduct gas. The byproduct gas was injected into a reactor at a constant flow rate of 2.5 cc/sec using the MFC.

As the byproduct gas flowed at the constant flow rate, carbon dioxide permeated through the separator made of the silicon tube. As a result, the collection rate of carbon dioxide separated from the byproduct gas was 97%.

COMPARATIVE EXAMPLE

Comparative Example 1

Comparative Example 1.1

An experiment was conducted in the same way as in Example 1 of the present invention except that a porous silicone tube having a thickness of 0.5 mm was used as the porous silicone membrane 20 instead of the porous silicone tube having a thickness of 2 mm in Example 1.

Comparative Example 1.2

An experiment was conducted in the same way as in Example 1 of the present invention except that a porous silicone tube having a thickness of 0.1 mm was used as the porous silicone membrane 20 instead of the porous silicone tube having a thickness of 2 mm in Example 1.

Comparative Example 2

Comparative Example 2.1

An experiment was conducted in the same way as in Example 2 of the present invention except that a porous silicone tube having a thickness of 0.5 mm instead of the porous silicone tube having a thickness of 2 mm in Example 2 was coated with nanoceramic and used as the porous silicone membrane 20.

Comparative Example 2.2

An experiment was conducted in the same way as in Example 2 of the present invention except that a porous silicone tube having a thickness of 0.1 mm instead of the porous silicone tube having a thickness of 2 mm in Example 2 was coated with nanoceramic and used as the porous silicone membrane 20.

TABLE 1

| | Thickness (mm) of separation membrane[a] | Flow rate (cc/sec) $CO_2$ | Flow rate (cc/sec) $N_2$ | Selectivity ($CO_2/N_2$) | Concentration of collected $CO_2$ (%) |
|---|---|---|---|---|---|
| Example 1 | 2 | 2.2 | 0.17 | 13 | 94 |
| Example 2 | 2 | 3.4 | 0.22 | 15 | 97 |
| Comparative Example 1.1 | 0.5 | 3.3 | 0.25 | 13 | 94 |
| Comparative Example 1.2 | 0.1 | 8.2 | 0.64 | 13 | 94 |
| Comparative Example 2.1 | 0.5 | 5.2 | 0.33 | 16 | 97 |
| Comparative Example 2.2 | 0.1 | 9.9 | 0.63 | 16 | 97 |

[a]Separation membrane made of pure porous silicone before being coated with nanoceramic.

As apparent from Table 1, the collection rate of carbon dioxide is higher when a porous silicone membrane coated with a nanoceramic material is used as a separator according to the present invention than when a pure porous silicone separation membrane is used as the separator. This indicates that carbon dioxide can be separated more effectively in the present invention.

Example 3: Example Method of Manufacturing a Carbon Dioxide Separation Membrane by Mixing a Silicone Rubber Raw Material, Ceramic Powder and a Curing Agent and Extruding the Mixture First, 980 g of silicon rubber raw material is prepared. Then, 10 g of nanoceramic powder having a grain size of 20 nm to 50 μm is mixed with 10 g of benzoyl peroxide which is a curing agent. The mixture is stirred for 10 to 200 minutes at room temperature to evenly mix the nanoceramic powder and the curing agent.

Then, 980 g of silicon rubber raw material is added to the mixture and kneaded for several hours at room temperature.

After an extruder is heated to a temperature of approximately 100° C., the kneaded mixture of the ceramic powder, the curing agent and the silicon rubber raw material is put into a hopper of the extruder. Then, a tube is drawn out through an extrusion die having a cross-sectional shape of a tube. The tube is cured for less than one hour in an oven heated to a temperature of approximately 200° C. A separation membrane in the form of a sheet can be manufactured in the same way as the separation membrane in the form of a tube but may be extruded using an extrusion die in the shape of a sheet.

INDUSTRIAL APPLICABILITY

The present invention uses a separator or plate made of a ceramic-coated porous silicone membrane. Therefore, the present invention can selectively separate carbon dioxide from a byproduct gas using a very small pressure difference and a simple method. In this regard, the present invention can be applied to an apparatus for separating carbon dioxide from a waste gas.

In addition, since the apparatus is operated at room temperature by maintaining a difference in pressure between the inside and outside of a separation membrane at less than 4 $kgf/cm^2$, energy consumption is low. Further, since the apparatus is simple, the product cost of the apparatus can be saved. Also, the apparatus can be installed even in dirty water that generates a byproduct gas or under water. Such ease of installation makes the apparatus industrially applicable.

The invention claimed is:

1. An apparatus for separating carbon dioxide, the apparatus comprising:
    a byproduct gas storage tank which stores a byproduct gas generated by an environmental treatment facility and containing methane and carbon dioxide;
    a byproduct gas inlet through which the byproduct gas is fed from the byproduct gas storage tank and a byproduct gas outlet through which a methane-containing byproduct gas obtained by separating carbon dioxide from the fed byproduct gas is discharged;
    a separation container which comprises a separator made of a porous silicone membrane that separates carbon dioxide from the fed byproduct gas;
    an outlet which is formed in the separation container to discharge carbon dioxide separated from the porous silicone membrane;
    a carbon dioxide storage tank which receives and stores the separated carbon dioxide; and
    a remaining byproduct gas storage tank which stores the methane-containing byproduct gas obtained by separating carbon dioxide from the fed byproduct gas,
    wherein the porous silicone membrane comprises a first surface and a second surface opposing to the first surface and the first surface and the second surface of the porous silicone membrane are coated with ceramic.

2. The apparatus of claim 1, wherein the separation container is maintained at a pressure of 0 to 4 $kgf/cm^2$ at room temperature.

3. The apparatus of claim 1, wherein the separator made of the porous silicone membrane is in the form of a vertical sheet, a horizontal sheet, or a tube.

4. The apparatus of claim 1, wherein the separator is one of a plurality of separators installed in the separation container.

5. The apparatus of claim 1, wherein the porous silicone membrane is formed by mixing a silicone rubber raw material, ceramic powder and a curing agent, extruding the mixture, and curing the extruded mixture at a temperature of 80 to 300° C.

6. The apparatus of claim 5, wherein the ceramic powder is added in an amount of 0.001 to 10% by weight based on the weight of the silicone rubber raw material.

7. The apparatus of claim 3, wherein a support and a mesh are installed between the separation membranes, which are in the form of the vertical sheet and the horizontal sheet and made of porous silicone, to maintain a predetermined gap between the separation membranes.

8. The apparatus at claim 7, wherein the support or the mesh is made of a metal to apply an electric field.

9. The apparatus of claim 8, wherein the electric field supplies any one or both of a direct current and an alternating current.

10. The apparatus of claim 9, wherein a voltage of the direct current range from 0.01 to 50 kV, a frequency of the alternating current ranges from 1 Hz to 1 MHz, and a voltage of the alternating current ranges from 0.01 to 50 kV.

11. The apparatus of claim 1, wherein a pump is used at the byproduct gas outlet to discharge the methane-containing byproduct gas without carbon dioxide.

12. The apparatus of claim 1, wherein a sound wave generator is installed around the porous silicone membrane to vibrate the porous silicone membrane.

13. A carbon dioxide separation membrane comprising:
    a separation membrane which is made of porous silicone; and
    a coated layer which is obtained by coating nanoceramic powder on the porous silicone separation membrane.

14. The membrane of claim 13, wherein the nanoceramic powder is any one or a combination of two or more of Fe-based oxide, Pd-based oxide, Ti-based oxide, and Al-based oxide.

15. The membrane claim 13, wherein the separation membrane made of porous silicone has a diameter of 2 to 50 mm and a thickness of 0.1 to 2 mm.

16. The membrane of claim 13, wherein pores formed in the separation membrane made porous silicone have a diameter of 0.32 to 0.35 nm.

17. The membrane of claim 13, wherein the nanoceramic powder has an average grain size of 1 to 100 nm.

18. The membrane of claim 13, wherein the ceramic-coated layer has a thickness of 2 nm to 100 μm.

19. A method of separating carbon dioxide from a byproduct gas using an apparatus for separating carbon dioxide which comprises the carbon dioxide separation membrane of claim 13.

20. The method of claim 19, wherein a difference in pressure between the inside and outside of a separator which is made of the porous silicone membrane is less than 4 $kgf/cm^2$.

* * * * *